(12) United States Patent
Lee et al.

(10) Patent No.: US 11,689,407 B2
(45) Date of Patent: Jun. 27, 2023

(54) METHOD AND APPARATUS FOR DOWNLINK OFDMA HAVING DFT-PRECODING APPLIED THERETO

(71) Applicant: Samsung Electronics Co., Ltd., Suwon-si (KR)

(72) Inventors: Seunghyun Lee, Suwon-si (KR); Hyojin Lee, Suwon-si (KR); Hanjin Kim, Suwon-si (KR); Yosub Park, Suwon-si (KR); Juho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 95 days.

(21) Appl. No.: 17/302,750

(22) Filed: May 11, 2021

(65) Prior Publication Data

US 2021/0359891 A1 Nov. 18, 2021

Related U.S. Application Data

(60) Provisional application No. 62/704,505, filed on May 13, 2020.

(30) Foreign Application Priority Data

Sep. 15, 2020 (KR) ......................... 10-2020-0118211

(51) Int. Cl.
*H04L 27/26* (2006.01)
*H04W 72/044* (2023.01)
(Continued)

(52) U.S. Cl.
CPC ....... *H04L 27/2636* (2013.01); *H04B 7/0456* (2013.01); *H04W 72/0466* (2013.01); *H04W 72/23* (2023.01)

(58) Field of Classification Search
CPC ............ H04L 27/2636; H04L 27/2614; H04B 7/0456; H04W 72/042; H04W 72/0466; H04W 72/23
(Continued)

(56) References Cited

U.S. PATENT DOCUMENTS 10,411,935 B2 9/2019 Cheng et al.
2009/0191910 A1* 7/2009 Athalye ............... H04W 52/367
455/522

(Continued)

FOREIGN PATENT DOCUMENTS

KR 2021088089 A * 7/2021
WO 2018/064313 A1 4/2018
(Continued)

OTHER PUBLICATIONS

International Search Report dated Aug. 31, 2021 in connection with International Patent Application No. PCT/KR2021/005826, 3 pages.

*Primary Examiner* — Rownak Islam

(57) ABSTRACT

The disclosure relates to a 5G or 6G communication system for supporting a higher data transfer rate beyond a 4G communication system, such as LTE. A method by a base station in a communication system according to an embodiment may include: determining the number of DFT-precoding chunks on which DFT precoding is performed; determining a power backoff value of a power amplifier (PA) of the base station; transmitting information indicating the number of DFT-precoding chunks to a terminal; transmitting downlink control information (DCI) including a resource allocation field, configured based on the number of DFT-precoding chunks, to the terminal; and transmitting data to the terminal according to the resource allocation field included in the DCI.

16 Claims, 19 Drawing Sheets

(51) Int. Cl.
   *H04B 7/0456*     (2017.01)
   *H04W 72/23*      (2023.01)
(58) Field of Classification Search
   USPC .......................................................... 370/329
   See application file for complete search history.

(56)             References Cited

U.S. PATENT DOCUMENTS

| 2010/0091729 | A1  | 4/2010 | Yang et al. |
| 2014/0078955 | A1* | 3/2014 | Nagaraja ............. H04B 7/2606 370/315 |
| 2018/0212813 | A1  | 7/2018 | Kim et al. |
| 2020/0008228 | A1  | 1/2020 | Lee et al. |
| 2021/0185679 | A1  | 6/2021 | Yoshimura et al. |

FOREIGN PATENT DOCUMENTS

| WO | 2020/027027 A1 | 2/2020 |
| WO | 2020/076656 A1 | 4/2020 |

* cited by examiner

FIG. 10

An example of K value and the corresponding PA power backoff       1001

| K | 1 | 2 | 4 |
|---|---|---|---|
| PA power backoff | 8.8 dB | 9.5 dB | 10.1 dB |

METHOD AND APPARATUS FOR DOWNLINK OFDMA HAVING DFT-PRECODING APPLIED THERETO

CROSS-REFERENCE TO RELATED APPLICATIONS

This application is based on and claims the benefit of U.S. Provisional Patent Application No. 62/704,505 filed on May 13, 2020 and Korean Patent Application No. 10-2020-0118211 filed on Sep. 15, 2020, the disclosures of which are herein incorporated by reference in their entirety.

BACKGROUND

1. Field

The disclosure relates to a method and an apparatus using a downlink OFDMA technique having DFT-precoding applied thereto.

2. Description of Related Art

Development of wireless communication through generations has been directed to technologies for services targeting humans (for example, voice communication, multimedia, and data services). It is expected that connected devices, which are exponentially increasing after commercialization of 5th-generation (5G) communication systems, will be connected to communication networks. Examples of things connected to networks include, for example, vehicles, robots, drones, home appliances, displays, smart sensors installed in various infrastructures, construction machines, and factory equipment. Mobile devices are expected to evolve into various form factors, such as augmented-reality glasses, virtual-reality headsets, and hologram devices. Efforts have been made, in the 6th-generation (6G) era, to develop improved 6G communication systems in order to provide various services by connecting billions of devices and things. For such a reason, 6G communication systems are referred to as Beyond-5G systems.

In 6G communication systems, which are expected to be implemented around 2030, the maximum transmission rate is a multiple of tera bps (1,000 giga bps), and the radio latency time is 100 μsec. That is, the transmission rate of 6G communication systems is 50 times that of 5G communication systems, and the radio latency time is ¹/₁₀ time thereof.

In order to accomplish such a high data transmission rate and ultra-low latency time, it has been considered to implement 6G communication systems in terahertz bands (for example, 95 GHz to 3 THz). It is expected that, in the terahertz bands, technologies capable of guaranteeing the coverage (distances reached by signals) will gain more importance due to severer path loss than in mmWave bands introduced by 5G and severer absorption in the atmosphere. Major technologies to be developed to guarantee the coverage include technologies superior to radio frequency (RF) elements, antennas, and orthogonal frequency division multiplexing (OFDM) in terms of coverage, such as novel waveforms, beamforming, massive multiple-input and multiple-output (MIMO), full dimensional MIMO (FD-MIMO), and multi-antenna transmission technologies (for example, array antennas and large-scale antennas). In addition, there is ongoing discussion regarding new technologies for improving the coverage of terahertz-band signals, such as metamaterial-based lenses and antennas, high-dimensional space multiplexing technology using orbital angular momentum (OAM), and reconfigurable intelligent surface (RIS).

Moreover, in order to improve the frequency efficiency and the system network, there is ongoing development of the following technologies in connection with 6G communication systems: a full duplex technology by which the uplink and the downlink simultaneously utilize the same frequency resource at the same time; a network technology for utilizing satellites and high-altitude platform stations (HAPS) in an integrated manner; a network structure innovation technology for supporting mobile base stations and the like and enabling network operation optimization and automation; a dynamic spectrum sharing technology through collision avoidance on the basis of spectrum use prediction; an AI-based communication technology in which artificial intelligence (AI) is utilized from the design stage, and an end-to-end AI support function is embedded, thereby implementing system optimization; and a next-generation distributed computing technology for implementing services at complexity levels that exceed the limit of the terminal computing capability by using super-high-performance communication and computing resources (for example, mobile edge computing (MEC) and clouds). In addition, there are ongoing efforts to design new protocols to be used in 6G communication systems, to implement hardware-based security environments, to develop mechanisms for safe data utilization, and to develop technologies regarding privacy maintenance methods, thereby further enhancing connectivity between devices, further optimizing networks, facilitating the tendency for software-based implementation of network entities, and increasing the degree of openness of radio communication.

It is expected that such research and development regarding 6G communication systems will enable the next hyper-connected experience through hyper-connectivity of 6G communication systems, encompassing not only connection between things, but also connection between humans and things. Specifically, it is predicted that it will be possible to provide, through 6G communication systems, services such as truly immersive extended reality (XR), high-fidelity mobile holograms, and digital replica. Furthermore, services such as remote surgery, industrial automation, and emergency response will be provided through 6G communication systems as a result of improved security and reliability, and will be applied to various fields including industrial, medical, automobile, and home appliance applications.

Meanwhile, there is ongoing research regarding a method for increasing the efficiency of a power amplifier (PA) of a base station or a terminal operating in a communication system described above.

The above information is presented as background information only to assist with an understanding of the disclosure. No determination has been made, and no assertion is made, as to whether any of the above might be applicable as prior art with regard to the disclosure.

SUMMARY

The efficiency of a power amplifier (PA) may be degraded in super-high-frequency bands such as terahertz bands (for example, 95 GHz to 3 THz) considered in 6G communication systems. In general, the power backoff of the PA increases in proportion to the peak-to-average power ratio of signals input to the PA, and the PA output efficiency decreases accordingly. Therefore, there is a need for a technology for reducing or appropriately adjusting the PAPR of signals in order to improve the efficiency of the PA in super-high-frequency bands.

A method by a base station in a communication system according to an embodiment may include: determining the number of DFT-precoding chunks associated with the number of terminals that undergo frequency division multiplexing (FDM); determining a power backoff value of a power amplifier (PA) of the base station; transmitting information indicating the number of DFT-precoding chunks to a terminal; transmitting downlink control information (DCI) including a resource allocation field, configured based on the number of DFT-precoding chunks, to the terminal; and transmitting data to the terminal according to the resource allocation field included in the DCI.

According to an embodiment, the number of DFT-precoding chunks may be associated with the power backoff value of the power amplifier of the base station.

According to an embodiment, the information indicating the number of DFT-precoding chunks may be transmitted to the terminal through at least one of system information, radio resource control (RRC) signaling, and downlink control information (DCI).

According to an embodiment, the method may further include determining the size of the determined number of DFT-precoding chunks, and the resource allocation field may be configured based on the determined size of the DFT-precoding chunks.

According to an embodiment, the DCI may include information related to the size of the DFT-precoding chunks.

In addition, a method by a terminal in a communication system according to an embodiment may include: receiving, from a base station, information indicating the number of DFT-precoding chunks on which DFT precoding is performed; receiving, from the base station, downlink control information (DCI) including a resource allocation field configured based on the number of DFT-precoding chunks; and receiving data from the base station based on the resource allocation field included in the DCI.

In addition, a base station in a communication system according to an embodiment may include: a transceiver; and a controller configured to determine the number of DFT-precoding chunks on which DFT precoding is performed, determine a power backoff value of a power amplifier (PA) of the base station, transmit information indicating the number of DFT-precoding chunks to a terminal, transmit downlink control information (DCI) including a resource allocation field, configured based on the number of DFT-precoding chunks, to the terminal, and transmit data to the terminal according to the resource allocation field included in the DCI.

In addition, a terminal in a communication system according to an embodiment may include: a transceiver; and a controller configured to receive, from a base station, information indicating the number of DFT-precoding chunks on which DFT precoding is performed, receive, from the base station, downlink control information (DCI) including a resource allocation field configured based on the number of DFT-precoding chunks, and receive data from the base station based on the resource allocation field included in the DCI.

A base station may determine the number and size of DFT-precoding in view of a trade-off between the appropriate coverage demanded by a given communication environment and the multiuser diversity gain, and may adjust the PA power backoff accordingly, thereby appropriately adjusting the output power of the PA.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 10 illustrates an example of a PA power backoff value configured by a base station according to the number (K) of DFT-precoding chunks according to an embodiment of the present disclosure;

DETAILED DESCRIPTION

Figure 1:
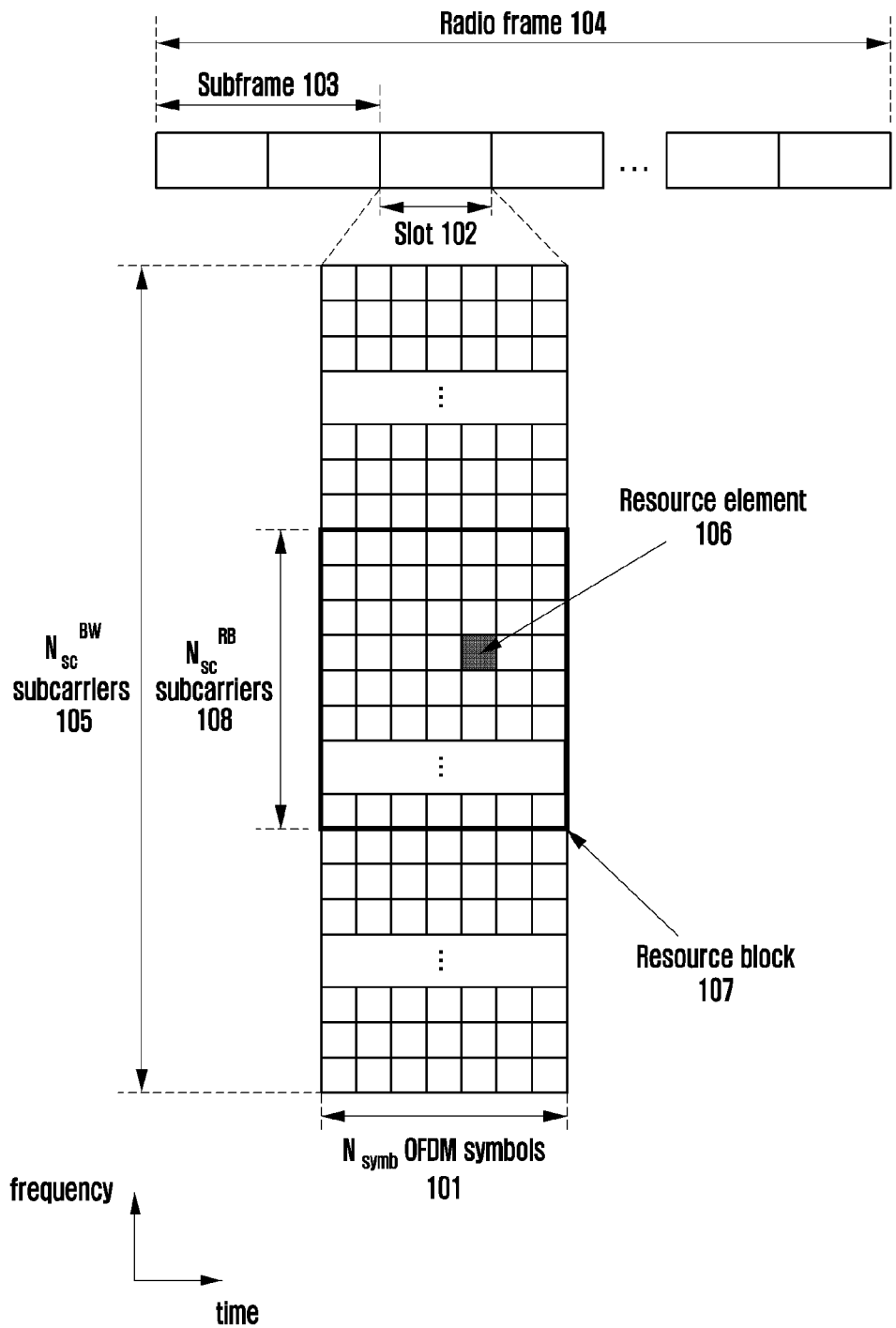
FIG. 1 illustrates a structure of a time-frequency domain of an LTE communication system according to an embodiment of the present disclosure.

FIGS. 1 through 18, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

A wireless communication system has evolved into a broadband wireless communication system that provides a high speed and high quality packet data service, like the communication standards, for example, high speed packet access (HSPA), long term evolution (LTE or evolved universal terrestrial radio access (E-UTRA)), and LTE-advanced (LTE-A) of 3GPP, high rate packet data (HRPD) and ultra-mobile broadband (UMB) of 3GPP2, IEEE 802.16e, and the like, departing from the early stage of providing only voice-oriented services.

An LTE system, which is a representative example of the broadband wireless communication system, adopts an orthogonal frequency division multiplexing (OFDM) scheme for a downlink (DL), and adopts a single carrier frequency multiple access (SC-FDMA) scheme for an uplink (UL). The uplink refers to a radio link through which a terminal (user equipment (UE)) or a mobile station (MS) transmits data or control signals to a base station (eNode or BS). The downlink refers to a radio link through which a base station transmits data or control signals to a terminal. In multiple access schemes as described above, time-frequency resources, on which data or control information is to be carried to each user, are usually allocated and managed to satisfy orthogonality, i.e., not to overlap to each other, so that data or control information for each user is distinguished.

A future communication system after LTE, that is, a 5G communication system, needs to freely apply various requirements from users, service providers, and the like, and thus, a service that satisfies various requirements at the same time needs to be supported. Services considered for the 5G communication system may include an enhanced mobile broadband (eMBB), massive machine type communication (mMTC), ultra-reliable-low latency communication (URLLC), and the like.

eMBB aims at providing a data transmission rate more enhanced than a data transmission rate supported by legacy LTE, LTE-A, or LTE-pro. For example, in the 5G communication system, eMBB needs to provide a maximum transmission rate (peak data rate) of 20 Gbps in a downlink, and a peak data rate of 10 Gbps in an uplink, from the perspective of one eNB. In addition, the 5G communication system needs to provide an enhanced user perceived data rate of a UE, while providing a peak data rate. In order to satisfy the requirements, there is a desire for improvement of various transmission or reception technologies including an advanced multi input multi output (MIMO) transmission technology. In addition, current LTE transmits a signal in a 2 GHz band using a maximum of 20 MHz transmission bandwidth. However, the 5G communication system uses a frequency bandwidth wider than 20 MHz in a frequency band ranging 3 to 6 GHz or in a frequency band greater than or equal to 6 GHz, and thus, the data transmission rate required by the 5G communication system may be satisfied.

At the same time, the 5G communication system considers mMTC in order to support application services such as the Internet of Things (IoT). mMTC requires supporting access of a large number of UEs within a cell, improvement of coverage of a UE, enhanced battery lifetime, reduction of cost of a UE, and the like, in order to effectively provide IoT. IoT provides a communication function via attachment to various sensors and various devices and thus, a large number of UEs need to be supported within a cell (e.g., 1,000,000 UEs/km2). In addition, a UE that supports mMTC has a high probability of being located in a shadow area that a cell cannot cover, such as the basement of a building, in terms of the feature of the service, and thus may require a coverage wider than those of other services provided in the 5G communication system. The UE that supports mMTC needs to be configured as an inexpensive UE, and the battery of the UE may not be changed frequently. Accordingly, a long battery lifetime such as in 10 to 15 years may be required.

Finally, URLLC is a cellular-based wireless communication service which is used for mission critical communication. For example, URLLC may consider services used for remote control for a robot or machinery, industrial automation, an unmanned aerial vehicle service, remote heath care, an emergency alert, and the like. Therefore, communication provided by the URLLC may need to provide significantly low latency and significantly high reliability. For example, the service that supports URLLC needs to satisfy an air interface latency less than 0.5 milliseconds, and at the same time, needs to satisfy a packet error rate less than or equal to 10-5. Therefore, for the service that supports URLLC, a 5G system needs to provide a transmit time interval (TTI) smaller than those of other services, and at the same time, is required to allocate broad resources in a frequency band in order to secure reliability of a communication link.

Three services in 5G, that is, eMBB, URLLC, and mMTC may be multiplexed and transmitted in one system. Here, in order to satisfy different requirements of the services, different transmission or reception schemes and transmission or reception parameters may be used among the services.

Hereinafter, the frame structure of LTE and LTE-A systems will be described in more detail with reference to the drawings.

FIG. 1 illustrates a structure of a time-frequency domain of an LTE communication system according to an embodiment of the present disclosure.

Referring to FIG. 1, the horizontal axis indicates the time domain, and the vertical axis indicates the frequency domain. In the time domain, the minimum transmitter is an OFDM symbol. Nsymb OFDM symbols 101 are gathered to configure one slot 102, and two slots are gathered to configure one subframe 103. The length of one slot is 0.5 ms, and the length of the subframe is 1.0 ms. In addition, a radio frame 104 is a time domain unit including 10 subframes. In the frequency domain, the minimum transmitter is a subcarrier. The entire system transmission bandwidth may include a total of NBW subcarriers 105. In the time-frequency domain, the basic resource unit is a resource element (RE) 106, and an RE is expressed by an OFDM symbol index and a subcarrier index. A resource block (RB) (an RB or a physical resource block (PRB)) 107 is defined by Nsymb consecutive OFDM symbols 101 in the time domain and NRB consecutive subcarriers 108 in the frequency domain. Therefore, one RB in the consecutive subcarriers 108 includes NsymbxNRB REs 106. Generally, the minimum transport unit of data is the RB. In the LTE system, generally, Nsymb=7 and NRB=12, and NBW and NRB are proportional to a system transmission bandwidth.

Subsequently, downlink control information (DCI) in LTE and LTE-A systems will be described in detail.

In LTE system, scheduling information associated with downlink data or uplink data is transmitted from an eNB to a UE via DCI. DCI may be operated by defining various formats and applying a DCI format determined according to whether scheduling information is associated with uplink data or downlink data, whether the size of control information is compact DCI, which is small, whether spatial multiplexing, which uses a multi-antenna, is applied, whether DCI is for power control, and the like. For example, DCI format 1 which is scheduling control information associated with downlink data may be configured to at least include the control information as follows.

Resource allocation type 0/1 flag: indicates whether a resource allocation scheme is type 0 or type 1. Type 0 applies a bitmap scheme and allocates resources in units of resource block groups (RBG). In the LTE system, a basic scheduling unit is a resource block (RB) and expressed by time and frequency domain resources, and an RBG includes a plurality of RBs and is used as a basic scheduling unit in the type 0 scheme. Type 1 allows allocation of a predetermined RB in an RBG.

Resource block assignment: indicates an RB allocated for data transmission. An expressed resource is determined according to the system bandwidth and resource allocation scheme.

Modulation and coding scheme (MCS): indicates a modulation scheme used for data transmission and the size of a transport block, which is data to be transmitted.

HARQ process number: indicates the process number of HARQ.

New data indicator: indicates HARQ initial transmission or retransmission.

Redundancy version: indicates the redundancy version of HARQ.

Transmit power control (TPC) command for physical uplink control channel (PUCCH): indicates a transmission power control command for a PUCCH which is an uplink control channel.

The DCI is subjected to a channel coding and modulation process, and then is transmitted via a PDCCH which is a downlink physical control channel.

A cyclic redundancy check (CRC) is added to the payload of a DCI message, and the CRC is scrambled by a radio network temporary identifier (RNTI) corresponding to a UE identity. Different RNTIs may be used depending on the purpose of a DCI message, for example, UE-specific data transmission, power control command, random access response, or the like. That is, an RNTI is not explicitly transmitted, but is transmitted by being included in a CRC calculation process. If a UE receives a DCI message transmitted on a PDCCH, the UE may identify a CRC using an allocated RNTI. If a result of the CRC identification is correct, the UE may identify that the corresponding message is transmitted to the UE.

Figure 2:
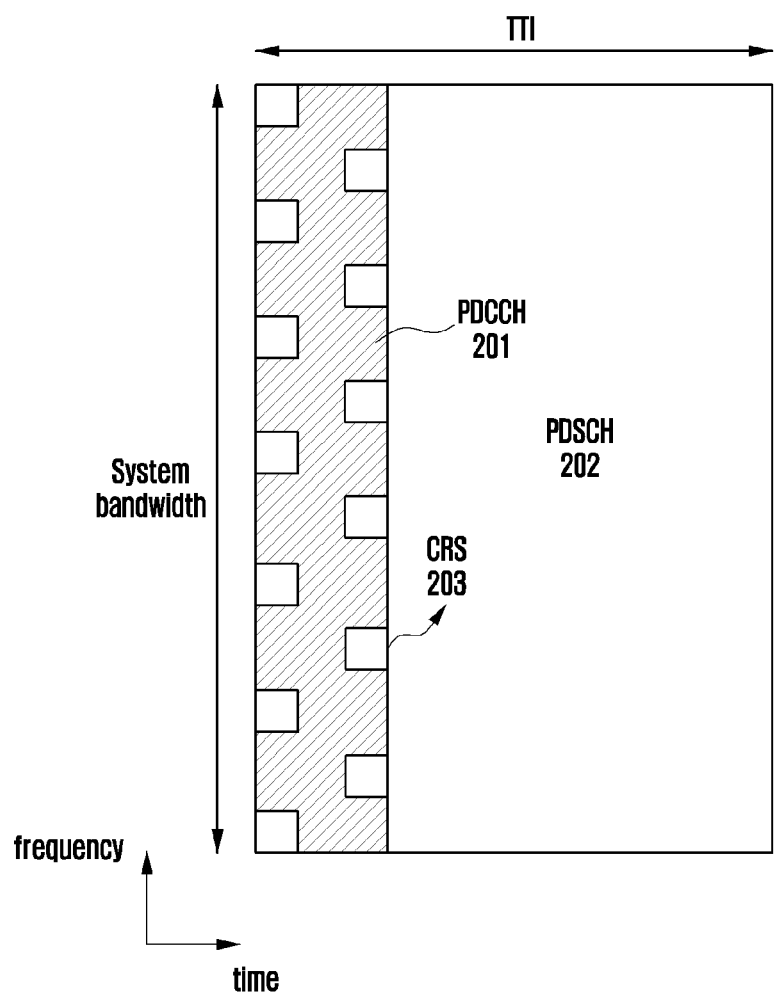
FIG. 2 illustrates a downlink control channel of an LTE communication system according to an embodiment of the present disclosure.

FIG. 2 illustrates a downlink control channel of an LTE communication system according to an embodiment of the present disclosure.

Referring to FIG. 2, a PDCCH 201 is time-multiplexed with a PDSCH 202 which is a data transmission channel, and is transmitted over the entire system bandwidth. The region of the PDCCH 201 is expressed as the number of OFDM symbols, which is indicated to a UE by means of a control format indicator (CFI) transmitted via a physical control format indicator channel (PCFICH). By allocating the PDCCH 201 to OFDM symbols existing in a front part of a subframe, a UE is capable of decoding downlink scheduling allocation as soon as possible. Accordingly, a downlink shared channel (DL-SCH) decoding latency, that is, the overall downlink transmission latency, may be reduced. One PDCCH transfers one DCI message, and a plurality of UEs may be scheduled at the same time in a downlink and an uplink, and thus, transmission of a plurality of PDCCHs may be simultaneously performed in each cell. A cell-specific reference signal (CRS) 203 is used as a reference signal for decoding the PDCCH 201. The CRS 203 is transmitted for each subframe over the entire band, and scrambling and resource mapping may be different for each cell identity (ID). The CRS 203 is a reference signal used by all UEs in common, and thus, a UE-specific beamforming may not be used. Therefore, the multi-antenna transmission scheme for the PDCCH of LTE may be limited to an open-loop transmission diversity scheme. The UE implicitly obtains the number of ports of a CRS via decoding a physical broadcast channel (PBCH).

The resource allocation of the PDCCH 201 is performed in units of control-channel elements (CCE), and one CCE includes 9 resource element groups (REG), that is, a total of 36 resource elements (REs). The number of CCEs required for a specific PDCCH 201 may be 1, 2, 4, or 8, which may be different according to the channel coding rate of a DCI message payload. As described above, a different number of CCEs may be used for implementing link adaptation of the PDCCH 201. The UE needs to detect a signal without knowing information associated with the PDCCH 201. In LTE, a search space indicating a set of CCEs is defined for blind decoding. The search space includes a plurality of sets according to aggregation level (AL) of each CCE, which is not explicitly signaled but is implicitly defined by a function and subframe number associated with a UE identity. In each subframe, the UE performs decoding of the PDCCH 201 with respect to all available resource candidates which can be formed from CCEs in a configured search space, and processes information declared to be valid for the corresponding UE via CRC identification.

The search space may be classified as a UE-specific search space and a common search space. A group of UEs or all UEs may investigate the common search space of the PDCCH 201 in order to receive cell-common control information such as a paging message or dynamic scheduling associated with system information. For example, scheduling allocation information of a DL-SCH for transmission of system information block (SIB)-1 including cell operator information or the like may be received by investigating the common search space of the PDCCH 201.

In LTE, the entire PDCCH region includes a set of CCEs in the logical region, and a search space including a set of CCEs exists. The search space may be classified as a common search space and a UE-specific search space, and the search space for an LTE PDCCH may be defined as shown in TABLE 1.

of UE #1 and UE #2 partially overlap in a specific subframe, the overlap may be different in a subsequent subframe since a UE-specific search space is different for each subframe.

According to the definition of the search space for a PDCCH, a common search space is defined as a set of CCEs agreed upon in advance since a predetermined group of UEs or all UEs need to receive a PDCCH. In other words, the common search space is not changed depending on a UE identity, a subframe number, or the like. Although the common search space exists for transmission of various system messages, the common search space may be used for transmitting control information of an individual UE. Accordingly, the common search space may be used as a solution for a phenomenon in which a UE is not scheduled due to lack of available resources in a UE-specific search space.

A search space is a set of candidate control channels formed by CCEs which a UE needs to attempt to decode, on a given aggregation level. There are multiple aggregation levels in which one, two, four, and eight CCEs configure one bundle, and a UE has multiple search spaces. In an LTE PDCCH, the number of PDCCH candidates that a UE needs to monitor in a search space defined according to an aggregation level is defined in TABLE 2 below.

TABLE 2

| Type | Search space $S_k^{(L)}$ | | Number of PDCCH candidates $M^{(L)}$ |
|---|---|---|---|
| | Aggregation level L | Size [in CCEs] | |
| UE-specific | 1 | 6 | 6 |
| | 2 | 12 | 6 |

TABLE 1

The set of PDCCH candidates to monitor are defined in terms of search spaces, where a search space $S_k^{(L)}$ at aggregation level L ∈ {1,2,4,8} is defined by a set of PDCCH candidates. For each serving cell on which PDCCH is monitored, the CCEs corresponding to PDCCH candidate m of the search space $S_k^{(L)}$ are given by
$L \{(Y_k + m') \bmod \lfloor N_{CCE,k}/L \rfloor\} + i$
where $Y_k$ is defined below, i = 0, ..., L − 1. For the common search space m' = m. For the PDCCH UE specific search space, for the serving cell on which PDCCH is monitored, if the monitoring UE is configured with carrier indicator field then m' = m + $M^{(L)} \cdot n_{CI}$ where $n_{CI}$ is the carrier indicator field value, else if the monitoring UE is not configured with carrier indicator field then m' = m, where m = 0, ..., $M^{(L)}$ − 1. $M^{(L)}$ is the number of PDCCH candidates to monitor in the given search space.
Note that the carrier indicator field value is the same as ServCellIndex
For the common search spaces, $Y_k$ is set to 0 for the two aggregation levels L = 4 and L = 8.
For the UE-specific search space $S_k^{(L)}$ at aggregation level L, the variable $Y_k$ is defined by
$Y_k = (A \cdot Y_{k-1}) \bmod D$
where $Y_{-1} = n_{RNTI} \neq 0$, A = 39827, D = 65537 and k = $\lfloor n_s/2 \rfloor$, $n_s$ is the slot number within a radio frame.
The RNTI value used for $n_{RNTI}$ is defined in subclause 7.1 in downlink and subclause 8 in uplink.

According to the above-mentioned definition of the search space for a PDCCH as shown in Table 1, the UE-specific search space is not explicitly signaled but is defined implicitly by a function and a subframe number associated with a UE identity. In other words, a UE-specific search space is changed depending on a subframe number, and thus this indicates that the UE-specific search space may be changed over time. Accordingly, a problem (a blocking problem), in which a specific UE is incapable of using a search space due to other UEs among UEs, may be overcome. If a UE is not scheduled in a corresponding subframe since all CCEs that the UE investigates are currently used by other scheduled UEs within the same subframe, this problem may not occur in a subsequent subframe since the search space is changed over time. For example, although UE-specific search spaces TABLE 2-continued

| Type | Search space $S_k^{(L)}$ | | Number of PDCCH candidates $M^{(L)}$ |
|---|---|---|---|
| | Aggregation level L | Size [in CCEs] | |
| | 4 | 8 | 2 |
| | 8 | 16 | 2 |
| Common | 4 | 16 | 4 |
| | 8 | 16 | 2 |

According to TABLE 2, in a case of a UE-specific search space, aggregation levels {1, 2, 4, 8} are supported, and here, {6, 6, 2, 2} PDCCH candidates may be given, respectively. In a case of a common search space 302, aggregation levels {4, 8} are supported, and here, {4, 2} PDCCH candidates may be given, respectively. The reason why the common search space supports only aggregation levels {4, 8} is to improve a coverage characteristic, since a system message generally needs to arrive at the edge of a cell.

DCI transmitted in the common search space is defined for a specific DCI format such as 0/1A/3/3A/1C corresponding to the purpose of power control or the like for a UE group or a system message. In the common search space, a DCI format having spatial multiplexing is not supported. A downlink DCI format which is supposed to be decoded in a UE-specific search space may be changed depending on a transmission mode configured for a corresponding UE. The transmission mode is configured via RRC signaling and thus, a subframe number is not accurately designated in association with whether the corresponding configuration is effective for the corresponding UE. Therefore, the UE always performs decoding with respect to DCI format 1A irrespective of a transmission mode, so as to operate not to lose communication.

In the above, a search space and a method for transmitting or receiving a downlink control channel and downlink control information in the legacy LTE and LTE-A have been described.

Hereinafter, a downlink control channel in a 5G communication system will be described in more detail with reference to the drawings.

Figure 3:
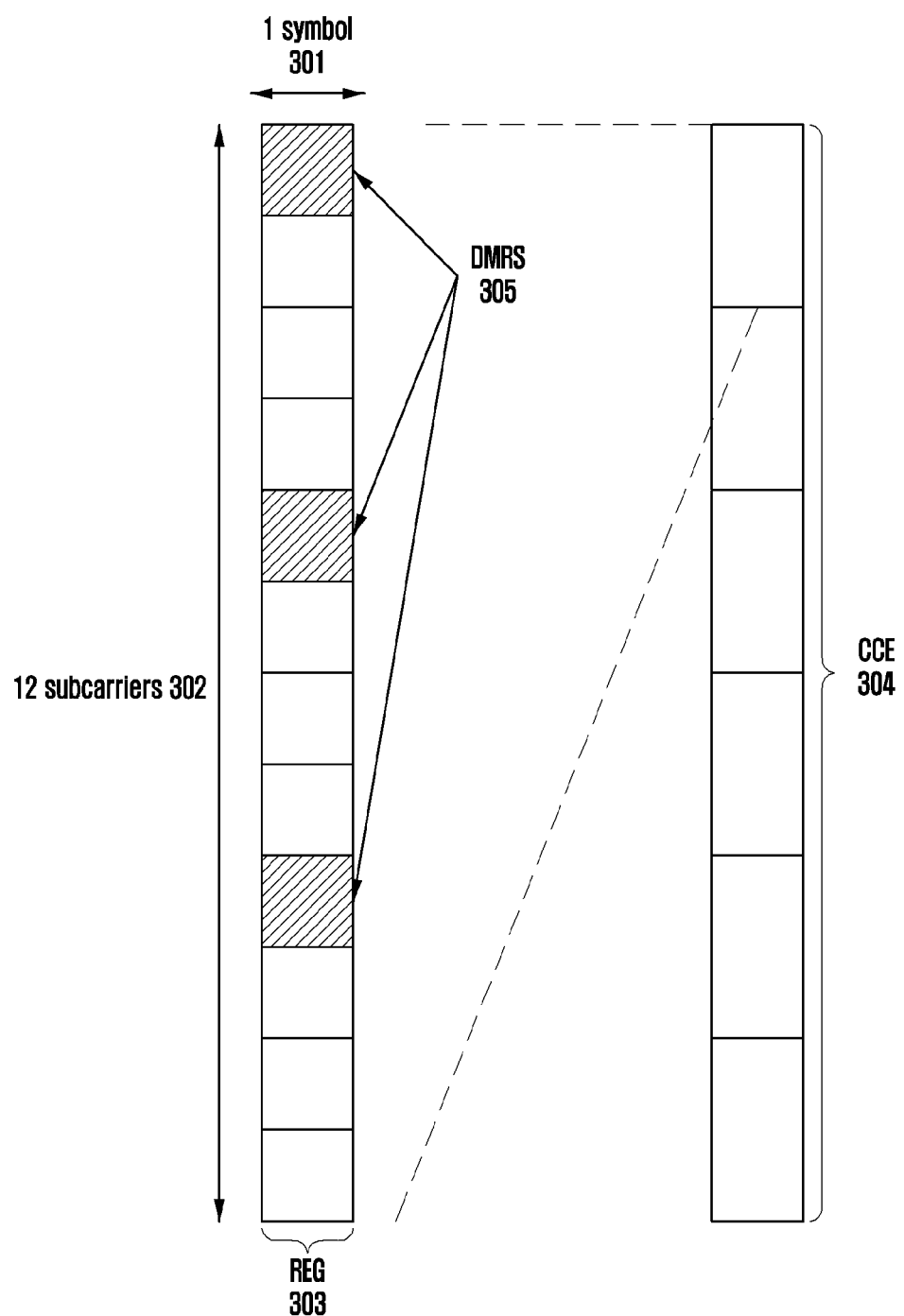
FIG. 3 illustrates a basic unit of a downlink control channel in a 5G communication system according to an embodiment of the present disclosure.

FIG. 3 illustrates a basic unit of a downlink control channel in a 5G communication system according to an embodiment of the present disclosure.

According to FIG. 3, the basic unit (REG) of time and frequency resources configured for a control channel includes 1 OFDM symbol 301 in the time axis and 12 subcarriers 302 in the frequency axis, that is, 1 RB. By assuming 1 OFDM symbol 301 as a time-axis basic unit when configuring the basic unit of a control channel, a data channel and a control channel may be time-multiplexed within one subframe. By placing the control channel before the data channel, processing time of a user may be reduced, and thus latency requirements may be easily satisfied. By configuring the frequency-axis basic unit of a control channel as 1 RB 302, the frequency multiplexing between the control channel and the data channel may be effectively performed.

By connecting REGs 303 illustrated in FIG. 3, a control channel region may be configured in various sizes. For example, when the CCE 304 is a basic unit for allocation of a downlink control channel in 5G, 1 CCE 304 may include a plurality of REGs 303. When describing the REG 303 of FIG. 3, for example, if the REG 303 includes 12 REs and 1 CCE 304 includes 6 REGs 303, this indicates that 1 CCE 304 includes 72 REs. If a downlink control region is configured, the corresponding region includes a plurality of CCEs 304, and a specific downlink control channel may be transmitted by being mapped to one or multiple CCEs 304 in the control region according to an aggregation level (AL). The CCEs 304 in the control region may be distinguished by numbers, and the numbers may be assigned according to a logical mapping scheme.

The basic unit of the downlink control channel of FIG. 3, that is, the REG 303 may include REs to which DCI is mapped and a region to which a demodulation reference signal (DMRS) 305, which is a reference signal for decoding the DCI, is mapped. As shown in FIG. 3, the DMRS 305 may be transmitted through 6 REs within 1 REG 303. For reference, since the DMRS 305 is transmitted using the same precoding as that of the control signal mapped in the REG 303, the UE can decode the control information without information on precoding that is applied by the base station.

Figure 4:
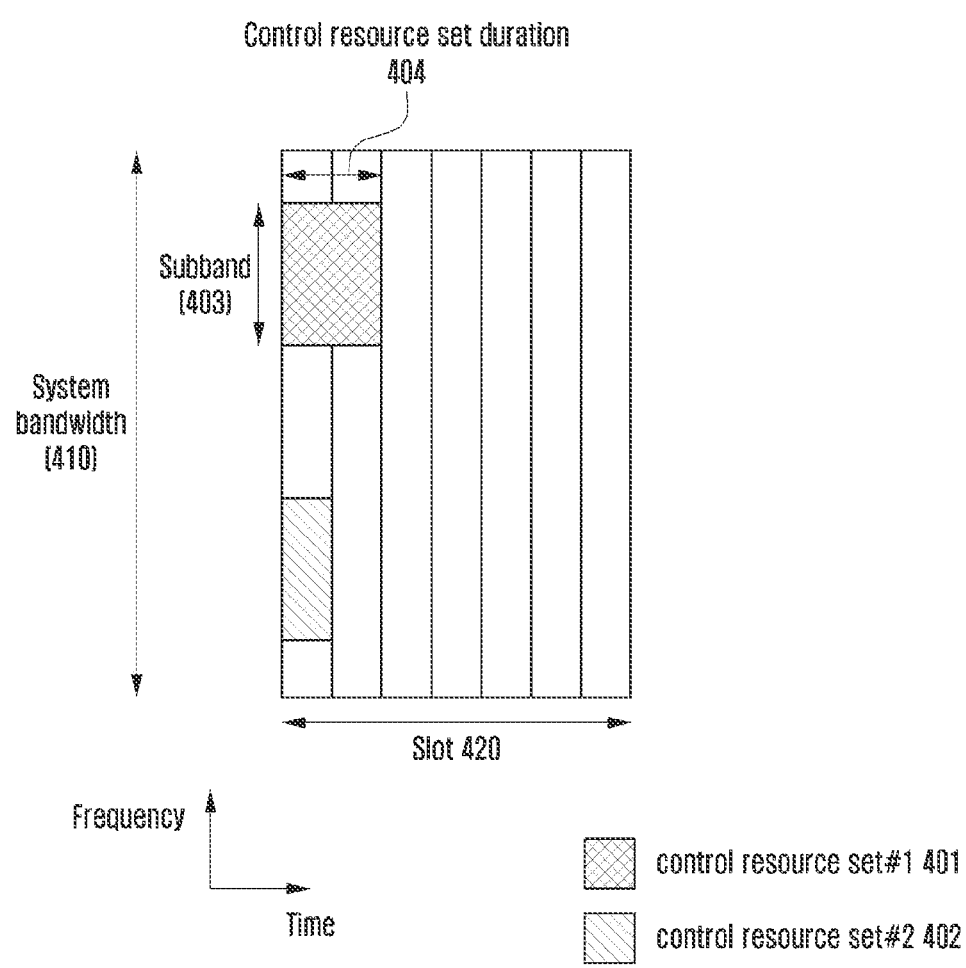
FIG. 4 illustrates a control resource set (CORESET) through which a downlink control channel is transmitted in a 5G communication system according to an embodiment of the present disclosure.

FIG. 4 illustrates a control resource set (CORESET) through which a downlink control channel is transmitted in a 5G communication system according to an embodiment of the present disclosure.

FIG. 4 illustrates an example in which two control regions (control region #1 401 and control region #2 402) are configured in a system bandwidth 410 in the frequency axis and 1 slot 420 in the time axis (e.g., an example of FIG. 4 assumes that 1 slot includes 7 OFDM symbols). The control region 401 or 402 may be configured based on a specific subband 403 within the entire system bandwidth 410 in the frequency axis. The control region may be configured based on one or multiple OFDM symbols, which may be defined as a control region length (control resource set duration 404), in the time axis. In the example of FIG. 4, the control region #1 401 is configured based on a control resource set duration of 2 symbols, and the control region #2 is configured based on a control resource set duration of 1 symbol.

The control region in 5G, as described above, may be configured via higher layer signaling (e.g., system information, master information block (MIB), radio resource control (RRC) signaling) from an eNB to a UE. Configuring a control region for a UE indicates providing information associated with the location of the control region, a subband, resource allocation of the control region, a control region length, and the like. For example, the configuration may include the following pieces of information as shown in TABLE 3.

TABLE 3

Configuration information 1. RB allocation information in frequency axis
Configuration information 2. Control region start symbol
Configuration information 3. Control region symbol length
Configuration information 4. REG bundling size (2, 3, or 6)
Configuration information 5. Transmission mode (Interleaved transmission scheme or Non-interleaved transmission scheme)
Configuration information 6. DMRS configuration information
Configuration information 7. Search space type (common search space, group-common search space, UE-specific search space)
Configuration information 8. DCI format to be monitored in a corresponding control region
others In addition to the above-described configuration information, various information required for transmitting a downlink control channel may be configured for a UE.

Next, downlink control information (DCI) in 5G will be described in detail.

In the 5G system, scheduling information for uplink data (physical uplink shared channel (PUSCH)) or downlink data (physical downlink shared channel (PDSCH)) is transmitted from a base station to a UE through DCI. The UE may monitor a DCI format for fallback and a DCI format for non-fallback with respect to the PUSCH or PDSCH. The DCI format for fallback may include a fixed field between a base station and a UE, and the DCI format for non-fallback may include a configurable field.

The fallback DCI format for scheduling PUSCH may include the following pieces of information, for example as shown in TABLE 4.

TABLE 4

Identifier for DCI formats - [1] bit
Frequency domain resource assignment -
$[\lceil \log_2(N_{RB}^{UL,BWP} (N_{RB}^{UL,BWP} + 1)/2) \rceil]$ bits TABLE 4-continued Time domain resource assignment - X bits
Frequency hopping flag - 1 bit.
Modulation and coding scheme - [5] bits
New data indicator - 1 bit
Redundancy version - [2] bits
HARQ process number - [4] bits
TPC command for scheduled PUSCH - [2] bits
UL/SUL indicator - 0 or 1 bit The non-fallback DCI format for scheduling the PUSCH may include the following pieces of information, for example as shown in TABLE 5.

TABLE 5

Carrier indicator - 0 or 3 bits
Identifier for DCI formats - [1]bits
Bandwidth part indicator - 0, 1 or 2 bits
Frequency domain resource assignment
    For resource allocation type 0, $\lceil N_{RB}^{UL,BWP}/P \rceil$ bits
    For resource allocation type 1, $\lceil \log_2 (N_{RB}^{UL,BWP} (N_{RB}^{UL,BWP} +1)/2) \rceil$ bits
Time domain resource assignment - 1, 2, 3, or 4 bits
VRB-to-PRB mapping - 0 or 1 bit, only for resource allocation type 1.
    0 bit if only resource allocation type 0 is configured;
    1 bit otherwise.
Frequency hopping flag - 0 or 1 bit, only for resource allocation type 1.
    0 bit if only resource allocation type 0 is configured;
    1 bit otherwise.
Modulation and coding scheme - 5 bits
New data indicator - 1 bit
Redundancy version - 2 bits as defined in 3GPP standard TS38.214
HARQ process number - 4 bits
1st downlink assignment index - 1 or 2 bits
    1 bit for semi-static HARQ-ACK codebook;
    2 bits for dynamic HARQ-ACK codebook with single HARQ-ACK codebook.
2nd downlink assignment index - 0 or 2 bits
    2 bits for dynamic HARQ-ACK codebook with two HARQ-ACK sub-codebooks;
    0 bit otherwise.
TPC command for scheduled PUSCH - 2 bits
SRS resource indicator - $\left\lceil \log_2\left(\sum_{k=1}^{L_{max}} \binom{N_{SRS}}{k}\right) \right\rceil$ or $\lceil \log_2 (N_{SRS}) \rceil$ bits
$\left\lceil \log_2\left(\sum_{k=1}^{L_{max}} \binom{N_{SRS}}{k}\right) \right\rceil$ bits for non-codebook based PUSCH transmission;
$\lceil \log_2(N_{SRS}) \rceil$ bits for codebook based PUSCH transmission.
Precoding information and number of layers - up to 6 bits
Antenna ports - up to 5 bits
SRS request - 2 bits
CSI request - 0, 1, 2, 3, 4, 5, or 6 bits
CBG transmission information - 0, 2, 4, 6, or 8 bits
PTRS-DMRS association - 2 bits.
beta_offset indicator - 2 bits
DMRS sequence initialization - 0 or 1 bit
UL/SUL indicator - 0 or 1 bit The fallback DCI format for scheduling the PDSCH may include the following pieces of information, for example as shown in TABLE 6-1.

TABLE 6-1

Identifier for DCI formats - [1] bit
Frequency domain resource assignment -
[$\lceil \log_2(N_{RB}^{DL,BWP} (N_{RB}^{DL,BWP} + 1)/2) \rceil$] bits
Time domain resource assignment - X bits TABLE 6-1-continued VRB-to-PRB mapping - 1 bit.
Modulation and coding scheme - [5] bits
New data indicator - 1 bit
Redundancy version - [2] bits
HARQ process number - [4] bits
Downlink assignment index - 2 bits
TPC command for scheduled PUCCH - [2] bits
PUCCH resource indicator - [2] bits
PDSCH-to-HARQ feedback timing indicator - [3] bits The non-fallback DCI format for scheduling the PDSCH may include the following pieces of information, for example as shown in TABLE 6-2.

TABLE 6-2

Carrier indicator - 0 or 3 bits
Identifier for DCI formats - [1] bits
Bandwidth part indicator - 0, 1 or 2 bits
Frequency domain resource assignment
    For resource allocation type 0, $\lceil N_{RB}^{DL,BWP}/P \rceil$ bits
    For resource allocation type 1, $\lceil \log_2(N_{RB}^{DL,BWP} (N_{RB}^{DL,BWP} + 1)/2) \rceil$ bits
Time domain resource assignment - 1, 2, 3, or 4 bits
VRB-to-PRB mapping - 0 or 1 bit, only for resource allocation type 1.
    0 bit if only resource allocation type 0 is configured;
    1 bit otherwise.
PRB bundling size indicator - 1 bit
Rate matching indicator - 0, 1, 2 bits
ZP CSI-RS trigger - X bits
For transport block 1:
    Modulation and coding scheme - 5 bits
    New data indicator - 1 bit
    Redundancy version - 2 bits
For transport block 2:
    Modulation and coding scheme - 5 bits
    New data indicator - 1 bit
    Redundancy version - 2 bits
HARQ process number - 4 bits
Downlink assignment index - 0 or 4 bits
TPC command for scheduled PUCCH - 2 bits
PUCCH resource indicator
PDSCH-to-HARQ_feedback timing indicator - 3 bits
Antenna ports - up to 5 bits
Transmission configuration indication - 3 bits
SRS request - 2 bits
CBG transmission information - 0, 2, 4, 6, or 8 bits
CBG flushing out information - 0 or 1 bit
DMRS sequence initialization - 0 or 1 bit The DCI may be subjected to a channel coding and modulation process, and may then be transmitted through a downlink physical downlink control channel (PDCCH). A cyclic redundancy check (CRC) is attached to a DCI message payload, and the CRC is scrambled by a radio network temporary identifier (RNTI) corresponding to a UE identity. Different RNTIs are used depending on the purpose of the DCI message, for example, UE-specific data transmission, power control command, random access response, or the like. The RNTI is not explicitly transmitted but is transmitted by being included in the CRC calculation process. Upon receiving the DCI message transmitted on the PDCCH, the UE checks the CRC by using the allocated RNTI. If a result of the CRC check is correct, it can be seen that the corresponding message has been transmitted to the UE.

For example, DCI for scheduling a PDSCH for system information (SI) may be scrambled by an SI-RNTI. DCI for scheduling a PDSCH for a random access response (RAR) message may be scrambled by a RA-RNTI. DCI for scheduling a PDSCH for a paging message may be scrambled by a P-RNTI. DCI which provides notification of a slot format indicator (SFI) may be scrambled by an SFI-RNTI. DCI which provides notification of transmit power control (TPC) may be scrambled by a TPC-RNTI. DCI for scheduling a UE-specific PDSCH or PUSCH may be scrambled by a cell RNTI (C-RNTI).

When a specific UE receives scheduling for a data channel, that is, a PUSCH or a PDSCH through the PDCCH, pieces of data are transmitted and received together with the DMRS in the scheduled resource region.

Figure 5:
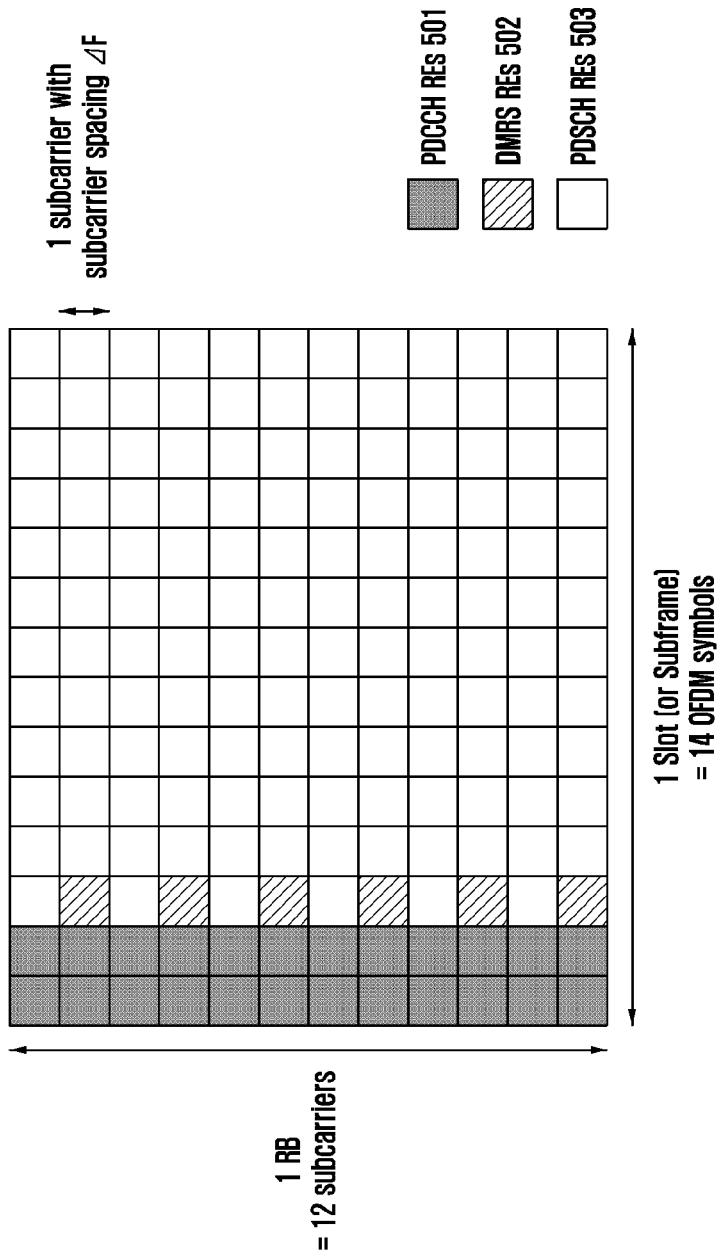
FIG. 5 illustrates an example of a resource block structure according to an embodiment of the present disclosure.

FIG. 5 illustrates an example of a resource block structure according to an embodiment of the present disclosure.

FIG. 5 illustrates a case in which 14 OFDM symbols are configured to be used as one slot (or subframe) by a particular UE in a downlink, the first two OFDM symbols are used for PDCCH transmission, and the third symbol is used for DMRS transmission. In FIG. 5, in a specific RB for which a PDSCH is scheduled, the PDSCH is transmitted by mapping data to REs, where a DRMS is not transmitted through the third symbol, and REs from the fourth symbol to the last symbol. A subcarrier spacing Δf of FIG. 5 may be 15 kHz in the LTE/LTE-A system, and may be one of {15, 30, 60, 120, 240, 480} kHz in the 5G system.

Meanwhile, in a cellular system, a base station needs to transmit a reference signal in order to measure a downlink channel state. In a 3GPP long term evolution advanced (LTE-A) system, a UE may measure a channel state between the base station and the UE by using a CRS or a CSI-RS transmitted from the base station. The channel state has to be measured considering various factors, and may include the amount of interference in a downlink. The amount of interference in the downlink may include an interference signal and thermal noise generated by antennas belonging to an adjacent base station, and is important in order for the UE to determine a channel condition of the downlink. For example, when a base station having one transmission antenna transmits a signal to a UE having one reception antenna, the UE needs to determine an Es/Io by determining the energy per symbol capable of being received through the downlink, and the amount of interference to be simultaneously received in a section where the corresponding symbol is received, based on the reference signal received from the base station. The determined Es/Io may be converted into a data transmission speed or a value corresponding thereto and transmitted to the base station in the form of a channel quality indicator (CQI) value, and may be used for the base station to determine a data transmission rate at which the base station performs data transmission to the UE.

In the LTE-A system, the UE may feedback information about the channel state of the downlink to the base station so that the information is used for downlink scheduling of the base station. That is, the UE measures the reference signal transmitted by the base station in the downlink and feeds back information extracted from the reference signal to the base station in the form defined in the LTE/LTE-A standards. The information which the UE feeds back in LTE/LTE-A may be referred to as channel state information, and the channel state information may include the following three pieces of information:

Rank indicator (RI): the number of spatial layers that may be received by a UE in a current channel state;

Precoding matrix indicator (PMI): an indicator of a precoding matrix preferred by the UE in the current channel state; and/or Channel quality indicator (CQI): a maximum data rate at which the UE may receive data in the current channel state;

The CQI may be replaced by a signal to interference plus noise ratio (SINR) that may be used similarly to the maximum data rate, a maximum error correction code rate and modulation method, data efficiency per frequency, and the like.

The RI, PMI, and CQI are associated with one another. For example, a precoding matrix supported in LTE/LTE-A is differently defined for each rank. Therefore, a PMI value "X" when the RI has a value of 1 and a PMI value "X" when the RI has a value of 2 may be interpreted differently. In addition, it is assumed that even when a UE determines a CQI, the rank and the PMI, notified of to the base station by the UE itself, are applied in the base station. That is, if the UE notifies the base station of RI_X, PMI_Y, and CQI_Z, the UE may receive a data rate corresponding to the CQI_Z when the rank is RI_X and the PMI is PMI_Y. As such, the UE may assume a transmission method by which the UE performs transmission to the base station in CQI calculation, thereby obtaining optimized performance when actual transmission is performed using the corresponding transmission method.

The RI, PMI, and CQI that are the channel state information fed back by the UE in LTE/LTE-A may be fed back periodically or aperiodically. When the base station is to aperiodically obtain the channel state information of a specific UE, the base station may be configured to perform aperiodic feedback (or aperiodic channel state information report) by using an aperiodic feedback indicator (or a channel state information request field, channel state information request information) included in downlink control information (DCI) for the UE. In addition, when the UE receives the indicator configured to perform the aperiodic feedback in an nth subframe, the UE may perform UL transmission by including aperiodic feedback information (or channel state information) in data transmission in an (n+k)th subframe. Here, k, which is a parameter defined in the 3GPP LTE Release 11 standard, may be 4 in frequency division duplexing (FDD), and may be defined as shown in TABLE 7 in time division duplexing (TDD).

TABLE 7 k value for each subframe number n in TDD UL/DL configuration

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — |

When aperiodic feedback is configured, the feedback information (or channel status information) includes RI, PMI, and CQI, and the RI and PMI may not be fed back according to the feedback configuration (or channel status report configuration).

Hereinafter, embodiments of the disclosure will be described in detail together with the accompanying drawings. Hereinafter, an embodiment of the disclosure will be described using an LTE or LTE-A system as an example, but the embodiment of the disclosure may be applied to other communication systems having a similar technical background or channel type. For example, 5G mobile communication technology (5G, new radio (NR)) developed after LTE-A may be included therein. Accordingly, the embodiments of the disclosure can be applied to other communication systems through some modifications without significantly departing from the scope of the disclosure as determination made by a person skilled in the art.

In addition, when it is determined that detailed descriptions of related functions or configurations may unnecessarily obscure the subject matter of the disclosure, detailed descriptions thereof will be omitted. In addition, terms to be described later are defined in consideration of functions in the disclosure, which may vary according to the intention or custom of users or operators. Therefore, the definition needs to be made based on the contents throughout the specification.

In the disclosure, a method of using an OFDMA scheme to which DFT-precoding is applied in a downlink is provided. In an ultra-high frequency band such as a terahertz band (e.g., ranging from 95 gigahertz to 3 terahertz band) that is considered in a 6G communication system, the efficiency of a power amplifier (PA) may decrease. In general, the higher the peak-to-average power ratio (PAPR) of the signal input to the PA, the higher the PA output-power-backoff, and accordingly, the lower the output efficiency of the PA. Accordingly, there is a need for a technique of reducing or appropriately adjusting the PAPR of a signal in order to increase the efficiency of the PA in the ultra-high frequency band. To this end, a downlink OFDMA method to which DFT-precoding is applied according to an embodiment includes a method of using DFT-precoding for downlink transmission in a base station, a method of adjusting the size of the PAPR of a transmission signal by adjusting the number of DFT-precoding chunks and the size thereof, and a method of adjusting the backoff value of the power amplifier (PA) in the base station transmitter according to the adjusted size of the PAPR, and accordingly adjusting the output power of the PA. All the embodiments and combinations of embodiments disclosed herein are not limited to an ultra-high frequency band (e.g., a terahertz band) and may be applied to any frequency band operated by a base station or a UE.

Figure 6:
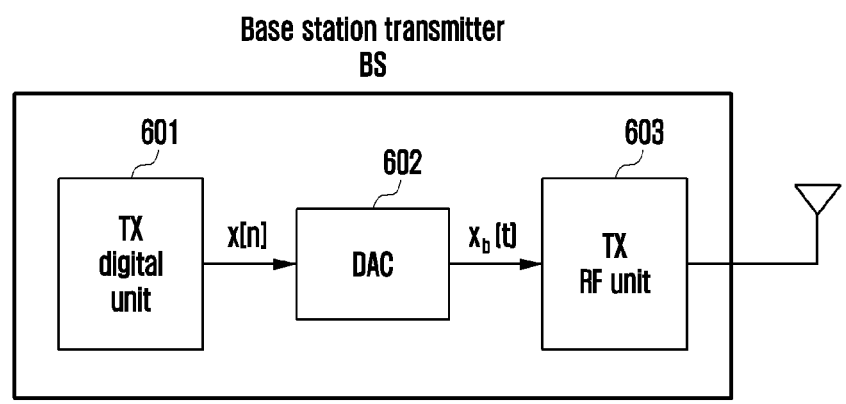
FIG. 6 illustrates a structure of a transmitter of a base station according to an embodiment of the present disclosure.

FIG. 6 illustrates a structure of a transmitter of a base station according to an embodiment of the present disclosure.

Referring to FIG. 6, the transmitter of the base station may include a base station digital transmitter 601, a digital-to-analog converter (DAC) 602, and a radio-frequency (RF) transmitter 603. A signal output from the base station digital transmitter 601 of the base station may be input to a digital-to-analog converter (DAC) 602 and converted into a baseband analog signal. The converted analog signal may be converted into a passband signal after being subjected to a process of the radio-frequency (RF) transmitter 603, and then may be transmitted to a UE. The RF transmitter 603 of the base station may include a mixer for up-conversion of a baseband analog signal by means of a carrier frequency, a phase shifter, and a PA. The disclosure includes a method of converting and controlling a PA backoff value in a base station according to the PAPR size of a baseband analog signal.

Figure 7:
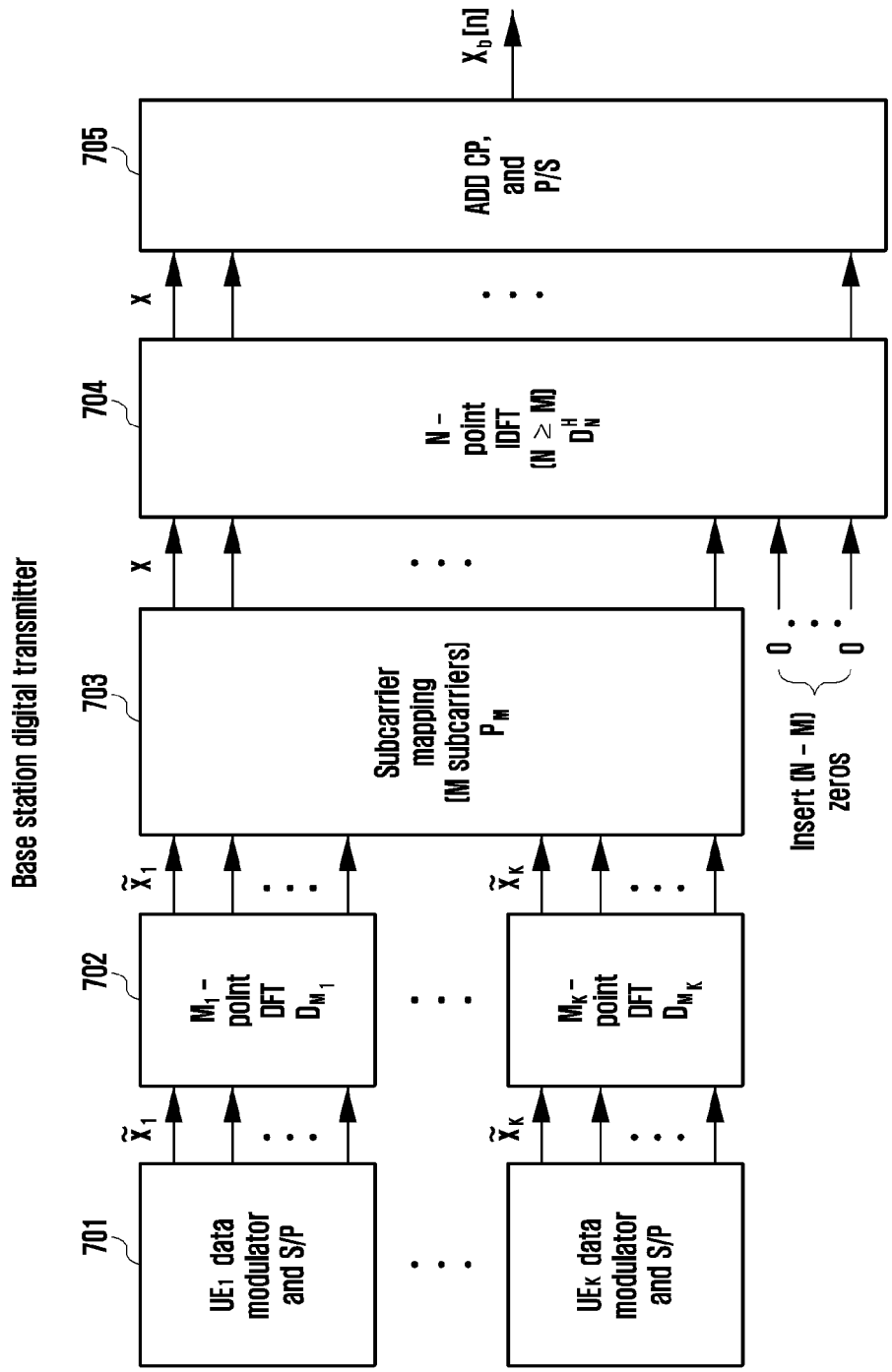
FIG. 7 illustrates a structure of a digital transmitter of a base station according to an embodiment of the present disclosure.

FIG. 7 illustrates a structure of a digital transmitter of a base station according to an embodiment of the present disclosure.

According to an embodiment, the digital transmitter of the base station may include: a data modulator for each of K terminals (UE1, . . . , UEK) subjected to frequency division multiplexing (FDM); and a serial-to-parallel (S/P) converter through which a signal output from the data modulator passes (indicated by reference numeral 701). The signal output from the data modulator and the S/P converter can be DFT precoded in units of K chunks (indicated by reference numeral 702). According to an embodiment, the digital transmitter of the base station may adjust the number of DFT-precoding chunks (i.e., the number of UEs subject to FDM) and respective sizes thereof. The number of DFT-precoding chunks affects the PAPR of the transmission signal, and the PAPR value of each signal increases as the number of DFT-precoding chunks increases and the PAPR value of each signal decreases as the number of DFT-precoding chunks decreases. The base station may increase the output of the PA by decreasing the PAPR value of each signal by configuring the number of DFT-precoding chunks to be smaller, for example, in a situation where PA output of a specific size or more is required, and adjusting the PA backoff value to be smaller accordingly. The base station may control respective DFT-precoding chunks to all have the same size, or may control respective DFT-precoding chunks to each have a different size. The signal of each UE subjected to DFT-precoding may be subjected to a subcarrier mapping process, and may be disposed at a band scheduled for each UE (indicated by reference numeral 703). Here, scheduling for each UE may be allocated to a contiguous resource block or a non-contiguous resource block. The signal subjected to subcarrier mapping may be subjected to a process of IDFT and then converted into a time-domain signal (indicated by reference numeral 704). The converted signal includes a cyclic prefix (CP) signal added thereto, and may be subjected to a process of a parallel-to-serial (P/S) converter and then transmitted (indicated by reference numeral 705).

Figure 8:
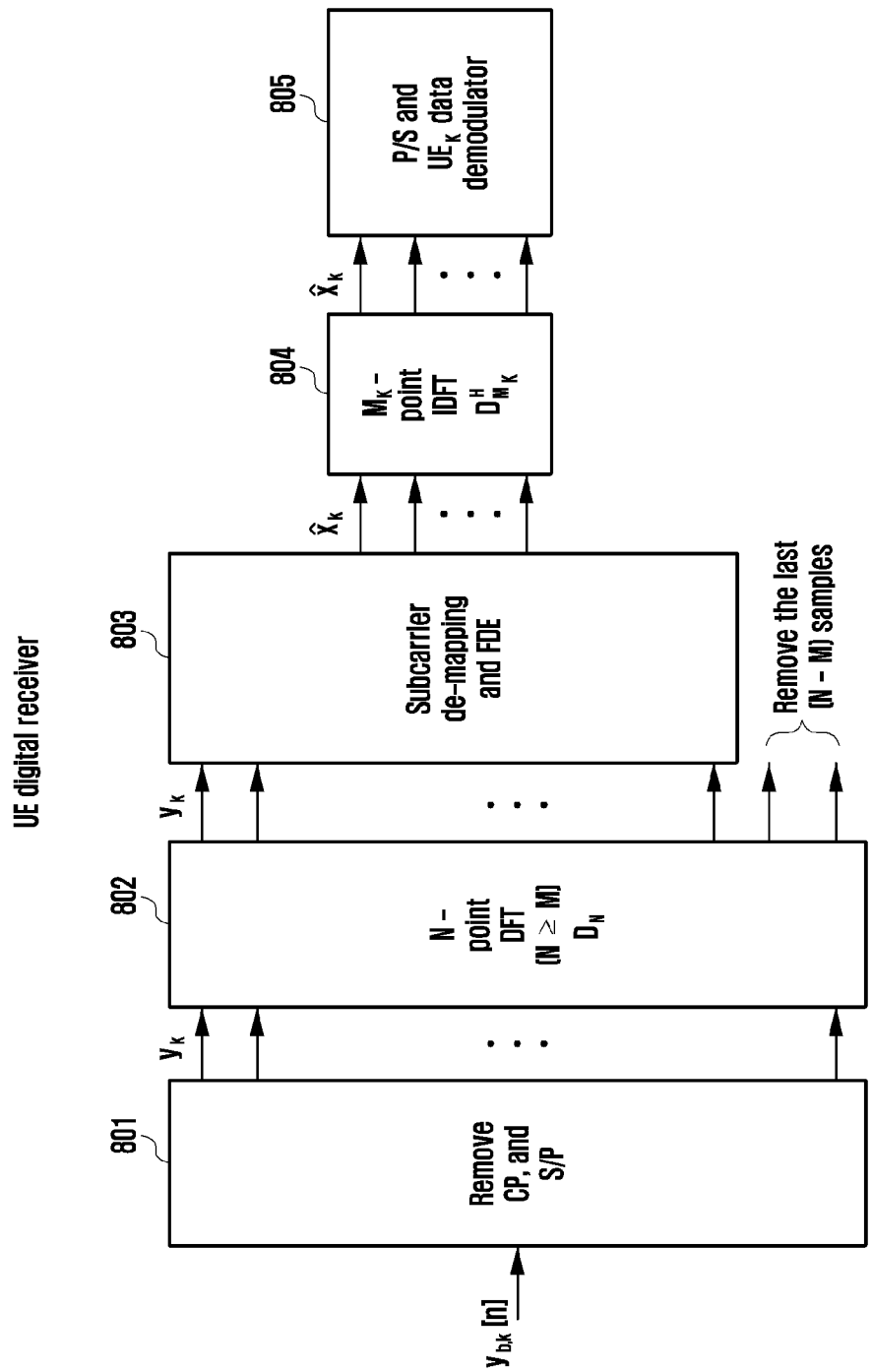
FIG. 8 illustrates a structure of a digital receiver of a UE according to an embodiment of the present disclosure.

FIG. 8 illustrates a structure of a digital receiver of a UE according to an embodiment of the present disclosure;

A time-domain digital signal received from a base station may be converted into a frequency-domain signal, by removing a CP therefrom and being subjected to processing through an S/P converter (indicated by reference numeral 801), and then being subjected to processing of the DFT (indicated by reference numeral 802). The converted signal may be subjected to a process of the subcarrier de-mapper 803 so that the UE may select its own signal only. Since the corresponding signal is a signal transmitted by the base station after being subjected to DFT-precoding, the signal is subjected to an IDFT process 804 to be finally transmitted to a demodulator 805.

Figure 9A:
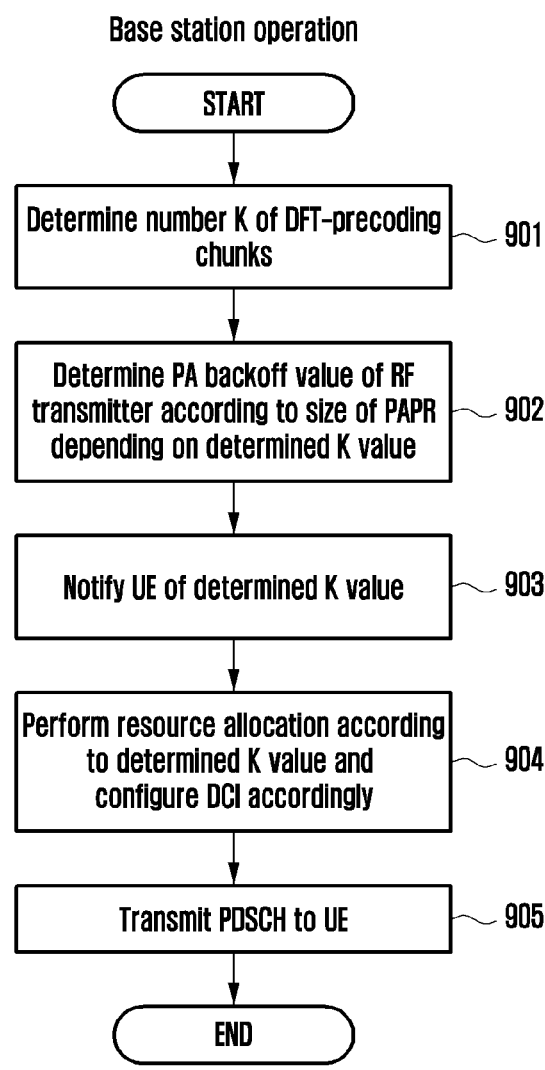
FIG. 9A illustrates an operation of a base station according to an embodiment of the present disclosure.
Figure 9B:
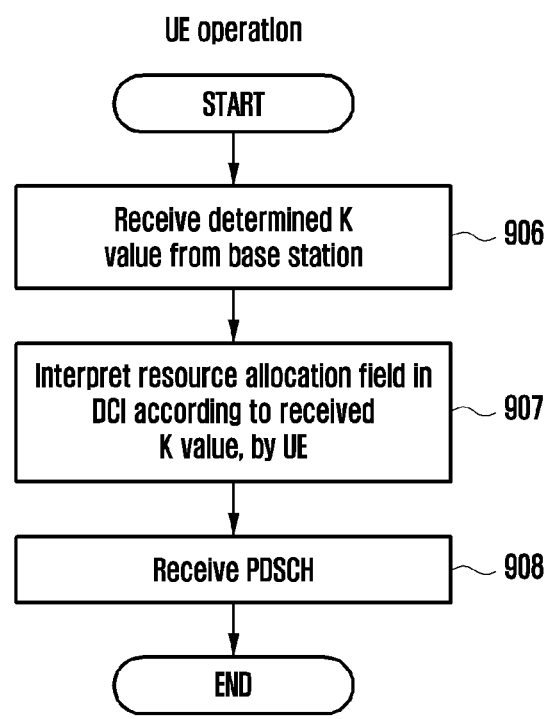
FIG. 9B illustrates an operation of a UE according to an embodiment of the present disclosure.

FIG. 9A illustrates an operation of a base station according to an embodiment, and FIG. 9B illustrates an operation of a UE according to an embodiment of the present disclosure.

According to FIG. 9A, the base station may determine a K value, which is the appropriate number of DFT-precoding chunks in a digital transmitter (indicated by reference numeral 901). The base station may determine a PA backoff value of an RF transmitter according to the PAPR value of a transmission signal, configured by the determined K value (indicated by reference numeral 902). The base station may transmit the determined K value to a UE (indicated by reference numeral 903), perform resource allocation according to the determined K value, configure DCI accordingly, and transmit the DCI to the UE (indicated by reference numeral 904). Thereafter, the base station may transmit a PDSCH to the UE according to resource allocation configuring the DCI (indicated by reference numeral 905).

According to FIG. 9B, the UE may receive the determined K value from the base station (indicated by reference numeral 906). The UE may receive, from the base station, DCI including a resource allocation field, and may interpret the resource allocation field in the DCI based on the received K value (indicated by reference numeral 907). The UE may receive the PDSCH based on the resource allocation field in the DCI (indicated by reference numeral 908).

Hereinafter, an example of a process in which the base station determines K, which is the number of DFT-precoding chunks, will be described.

FIG. 10 illustrates an example of a PA power backoff value, configured by a base station according to the number K of DFT-precoding chunks according to an embodiment. For a theoretically given number K of DFT-precoding chunks, the size of the PAPR is the largest when the sizes of all DFT-precoding chunks are identical, and in one embodiment, the value of the PA power backoff may be configured based on the PAPR when all the chunk sizes are identical, but is not limited thereto, and the value of PA power backoff may be configured according to other criteria. As shown in FIG. 10, as the number K of DFT-precoding chunks increases, a corresponding PA power backoff value increases, and accordingly, the output of the PA may decrease. On the other hand, as the number K of DFT-precoding chunks decreases, the corresponding PA power backoff value decreases, and accordingly, the output of the PA may increase. The base station may adjust the PA output by selecting an appropriate K value and a PA power backoff value related thereto according to the required level of the PA output. The specific values of the K value and the corresponding PA power backoff value disclosed in FIG. 10 are examples and do not limit the scope of the disclosure.

Typically, if the PA power backoff value increases as the value of K is configured to be large, the output power of the PA of a base station decreases accordingly, and thus the communication coverage decreases. However, since the frequency-domain resource can be more tightly operated, multiuser diversity gain can be increased through techniques such as channel-dependent scheduling. On the contrary, if the PA power backoff value decreases as the value of K is configured to be smaller, the output power of the PA of the base station increases accordingly, and thus the communication coverage increases. However, in the frequency-domain, there is no choice but to operate resources in larger units, and thus multiuser diversity gain may be reduced. Therefore, the base station may determine the optimal K value according to the situation by considering a trade-off between the appropriate coverage required in a given communication environment and the multiuser diversity gain, so as to adjust the PA power backoff and the output power of the PA according thereto. As an example of the given communication environment, in a situation where a small number of UEs are distributed on a cell edge, the base station may perform an operation of increasing coverage by configuring the K value to be smaller. In addition, in a situation where a large number of UEs are distributed within a close distance, the base station may allocate resources with an aim to increase the multiuser diversity effect by configuring the K value to be larger.

Hereinafter, FIGS. 11 to 14 illustrate various embodiments of a method in which a base station informs a UE of a determined K value, which is the number of DFT-precoding chunks.

A base station may perform scheduling or resource allocation for K UEs based on the K value, which is the number of DFT-precoding chunks. In addition, since scheduling for the UE is performed based on the K value determined by the base station according to a given communication environment, the base station needs to inform the UE of the determined K value. As an example of a method in which the base station informs the UE of the determined K value, when referring to FIGS. 11 to 14, the K value, which is the number of DFT-precoding chunks determined by the base station, may be transmitted to the UE through system information, such as a master information block (MIB) and a system information block (SIB), higher layer signaling such as radio resource control (RRC), or downlink control information (DCI).

Figure 11:
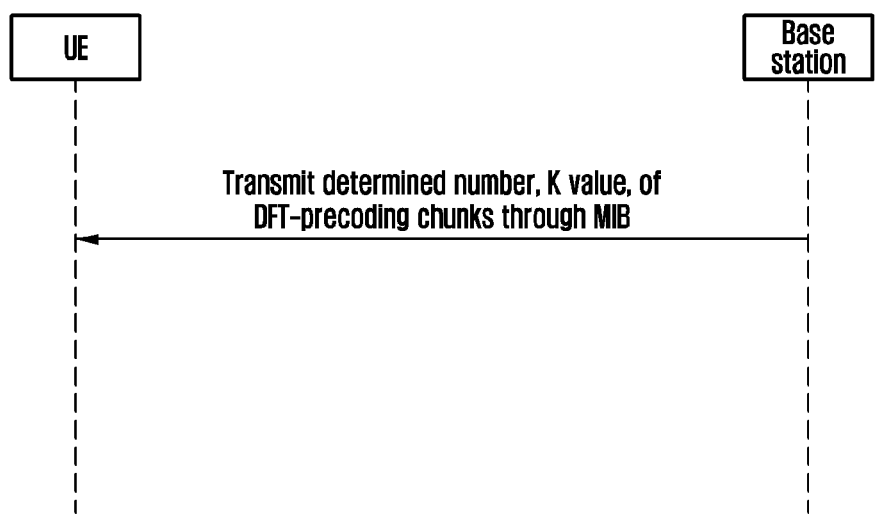
FIG. 11 illustrates a case in which a base station transmits the determined number, K value, of DFT-precoding chunks to a UE through a master information block (MIB) according to an embodiment of the present disclosure.

FIG. 11 illustrates a case in which a base station transmits a determined K value, which is the number of DFT-precoding chunks, to a UE through an MIB according to an embodiment of the present disclosure.

Figure 12:
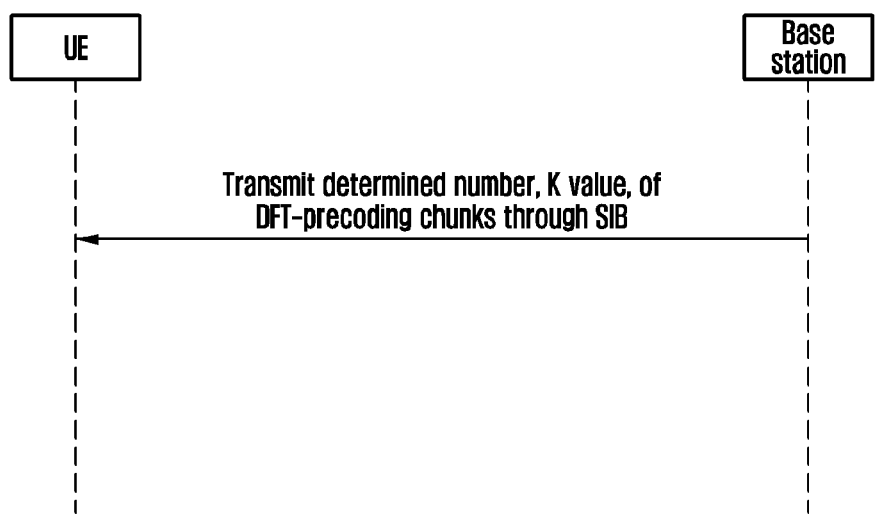
FIG. 12 illustrates a case in which a base station transmits the determined number, K value, of DFT-precoding chunks to a UE through a system information block (SIB) according to an embodiment of the present disclosure.

FIG. 12 illustrates a case in which a base station transmits a determined K value, which is the number of DFT-precoding chunks, to a UE through an SIB according to an embodiment of the present disclosure.

Figure 13:
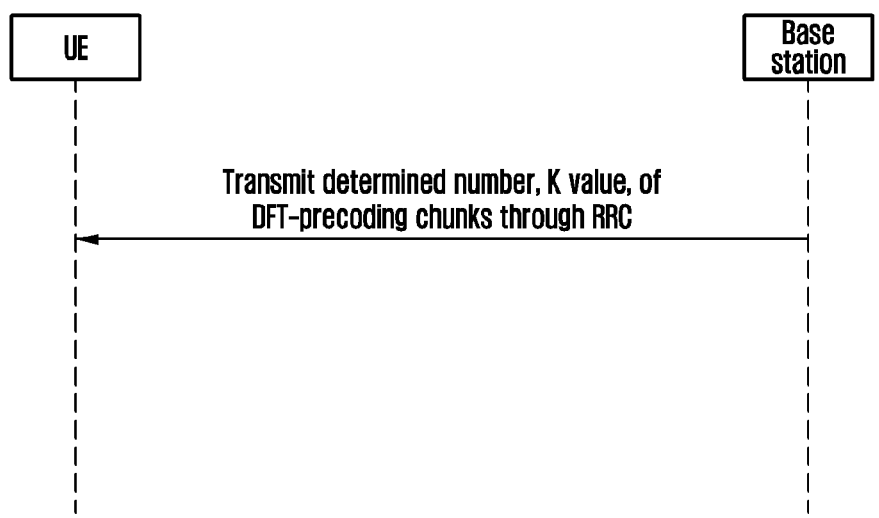
FIG. 13 illustrates a case in which a base station transmits the determined number, K value, of DFT-precoding chunks to a UE through radio resource control (RRC) according to an embodiment of the present disclosure.

FIG. 13 illustrates a case in which a base station transmits a determined K value, which is the number of DFT-precoding chunks, to a UE through RRC according to an embodiment of the present disclosure.

Figure 14:
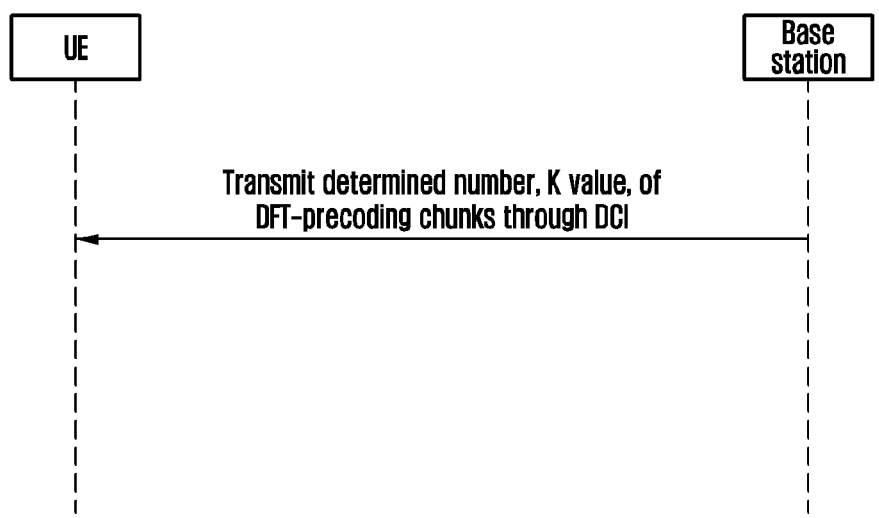
FIG. 14 illustrates a case in which a base station transmits the determined number, K value, of DFT-precoding chunks to a UE through downlink control information (DCI) according to an embodiment of the present disclosure.

FIG. 14 illustrates a case in which a base station transmits a determined K value, which is the number of DFT-precoding chunks, to a UE through DCI according to an embodiment of the present disclosure.

The base station may inform the UE of the K value, which is the number of DFT-precoding chunks, determined using any one of the methods disclosed in FIGS. 11 to 14 or a combination of these methods.

As shown in FIG. 14, when the UE receives the K value through DCI, the UE may not know the K value configured by the base station until receiving a PDCCH through which DCI is transmitted. Here, the base station may operate based on the value K=1 at the PDCCH transmission. In addition, the UE may receive the PDCCH through blind decoding, with respect to all K values, by using the same size chunk, while a value of K>1 is used.

Hereinafter, an embodiment regarding a method of determining the size of K DFT-precoding chunks determined by the base station and configuring a resource allocation field included in the DCI accordingly will be described.

Figure 15:
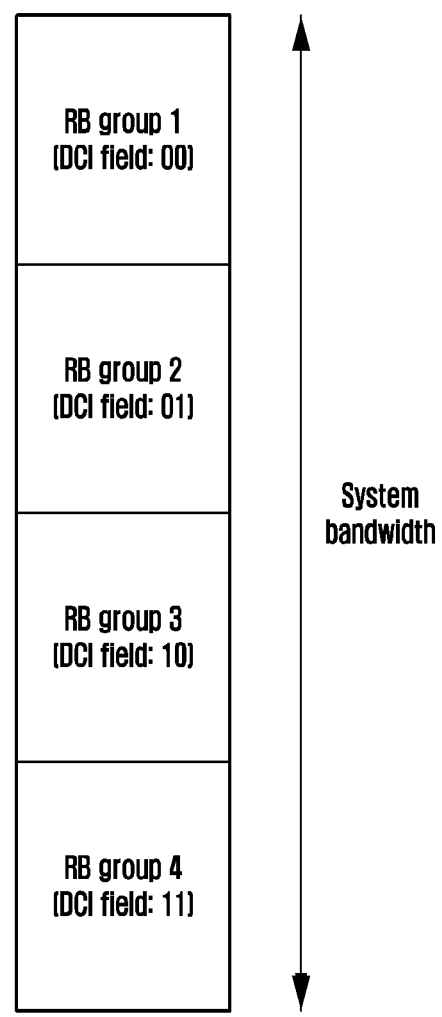
FIG. 15 illustrates a case in which the sizes of K DFT-precoding chunks are controlled to be identical according to an embodiment of the present disclosure.

FIG. 15 illustrates a case in which the sizes of K DFT-precoding chunks are controlled to be identical according to an embodiment of the present disclosure.

When a base station controls respective DFT-precoding chunks to all have the same size and performs resource allocation to a contiguous resource block, the base station may configure a frequency resource allocation field in the DCI according to the determined K DFT-precoding chunks. Here, the base station may inform the UE that respective chunk sizes are the same by using a 1-bit field in the DCI. The UE may determine the size of an inverse discrete Fourier transform (IDFT) of the receiving terminal according to the received K value and the chunk size. In an embodiment, the base station may configure the number of bits, required for the resource allocation field in the DCI, to be an integer number greater than or equal to log 2K. Here, each bit, the number of which is an integer number greater than or equal to log 2K, configuring the resource allocation field may indicate the sequential position of a resource block group in a system bandwidth, to which a specific UE is scheduled.

When a base station controls respective DFT-precoding chunks to all have the same size and performs resource allocation to a contiguous resource block, the base station may configure a frequency resource allocation field in the DCI according to the determined K DFT-precoding chunks. Here, the base station may inform the UE that respective chunk sizes are the same by using a 1-bit field in the DCI. The UE may determine the size of an inverse discrete Fourier transform (IDFT) of the receiving terminal according to the received K value and the chunk size. In an embodiment, the base station may configure the resource allocation field in the DCI using a bitmap scheme. Here, the required number of bits may be configured to be the same as the number of chunks controlled by the base station. Each bit of the bitmap configuring the resource allocation field may indicate the sequential position of a resource block group in a system bandwidth, to which a specific UE is scheduled.

Figure 16:
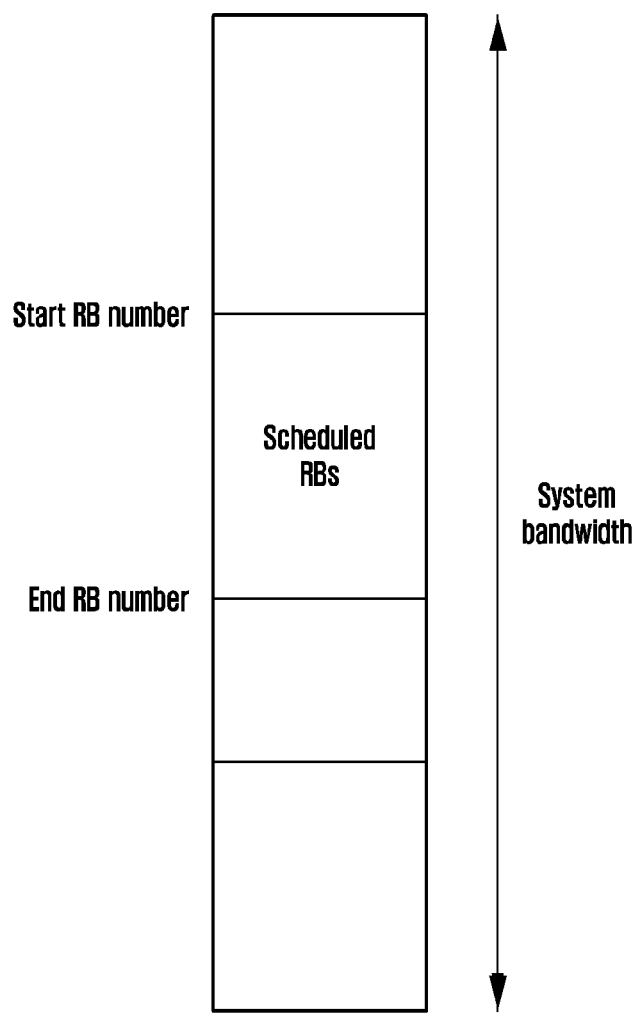
FIG. 16 illustrates a case in which the sizes of K DFT-precoding chunks are controlled to be different according to an embodiment of the present disclosure.

FIG. 16 illustrates a case in which the sizes of K DFT-precoding chunks are controlled to be different according to an embodiment of the present disclosure.

When a base station controls respective DFT-precoding chunks to each have a different size and performs resource allocation to a contiguous resource block, the base station may configure a frequency resource allocation field in the DCI according to the determined K DFT-precoding chunks. Here, the base station may inform the UE that the chunk size is different using a 1-bit field in the DCI. The UE may determine the size of an inverse discrete Fourier transform (IDFT) of the receiving terminal according to the received K value and the chunk size. Here, the base station may transfer frequency domain scheduling information to a specific UE by using the resource block (RB) number or resource element (RE) number of the start point and the end point of a band scheduled to the specific UE in the resource allocation field in the DCI.

When a base station controls respective DFT-precoding chunks to each have a different size and performs resource allocation to a non-contiguous resource block, the base station may configure a frequency resource allocation field in the DCI according to the determined K DFT-precoding chunks. Here, the base station may inform the UE that the chunk size is different using a 1-bit field in the DCI. The UE may determine the size of an inverse discrete Fourier transform (IDFT) of the receiving terminal according to the received K value and the chunk size. Here, the base station may configure the resource allocation field in the DCI using a bitmap scheme. Here, the number of bits configuring the bitmap may be configured to be the same as the total number of RBs in the system bandwidth. Each bit of the bitmap configuring the resource allocation field may indicate the sequential position of a resource block group in a system bandwidth, to which a specific UE is scheduled.

Figure 17:
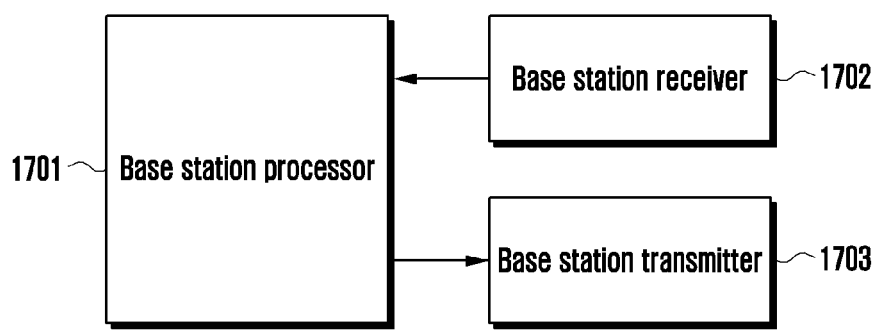
FIG. 17 is a block diagram illustrating a structure of a base station according to an embodiment of the present disclosure.

FIG. 17 is a block diagram illustrating a structure of a base station according to an embodiment of the present disclosure.

Referring to FIG. 17, a base station may include a base station receiver 1702, a base station transmitter 1703, and a base station processor 1701. The base station receiver 1702 and the base station transmitter 1703 may be referred to as a transceiver. The base station receiver 1702, the base station transmitter 1703, and the base station processor 1701 of the base station may operate according to the communication method by the base station described above. However, the elements of the base station are not limited to the above-described example. For example, the base station may include more or fewer elements (e.g., memory, etc.) than those described above. In addition, the base station receiver 1702, the base station transmitter 1703, and the base station processor 1701 may be implemented in the form of a single chip.

The base station receiver 1702 and the base station transmitter 1703 (or the transceiver) may transmit or receive signals to or from a UE. Here, the signal may include control information and data. To this end, the transceiver may include an RF transmitter that up-converts and amplifies a frequency of a transmitted signal, and an RF receiver that performs low-noise amplification on a received signal and down-converts a frequency. However, the transceiver may be an example, and elements of the transceiver are not limited to the RF transmitter and the RF receiver.

In addition, the transceiver may receive a signal through a wireless channel and may output the signal to the base station processor 1701, and may transmit a signal output from the base station processor 1701 through a wireless channel.

The memory (not shown) may store programs and data required for the operation of the base station. In addition, the memory may store control information or data included in a signal obtained from the base station. The memory include a storage medium such as a ROM, a RAM, a hard disk, a CD-ROM, a DVD, or a combination of storage media.

The base station processor 1701 may control a series of processes so that the base station may operate according to the above-described embodiment. The base station processor 1701 may be implemented by a controller or one or more processors.

Figure 18:
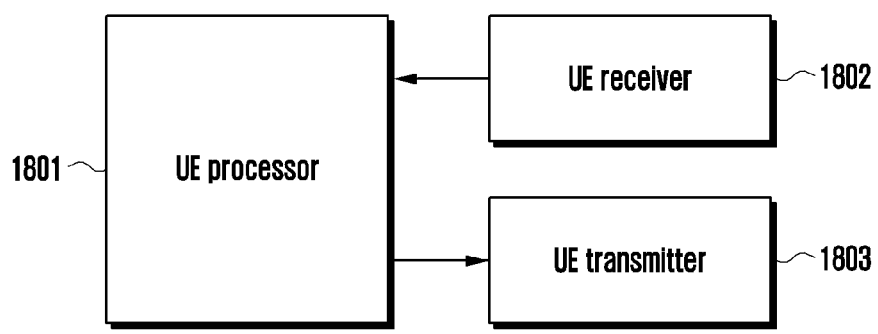
FIG. 18 is a block diagram illustrating a structure of a UE according to an embodiment of the present disclosure.

FIG. 18 is a block diagram illustrating a structure of a UE according to an embodiment of the present disclosure.

Referring to FIG. 18, a UE may include a UE receiver 1802, a UE transmitter 1803, and a UE processor 1801. The UE receiver 1802 and the UE transmitter 1803 may be referred to as a transceiver. The UE receiver 1802, the UE transmitter 1803, and the UE processor 1801 of the UE may operate according to the above-described communication method by the UE. However, the elements of the UE are not limited to the above-described example. For example, the UE may include more or fewer elements (e.g., memory, etc.) than those described above. In addition, the UE receiver 1802, the UE transmitter 1803, and the UE processor 1801 may be implemented in the form of a single chip.

The UE receiver 1802 and the UE transmitter 1803 (or the transceiver) may transmit or receive signals to or from the base station. Here, the signal may include control information and data. To this end, the transceiver may include an RF transmitter that up-converts and amplifies a frequency of a transmitted signal, and an RF receiver that performs low-noise amplification on a received signal and down-converts a frequency. However, this is only an embodiment of the transceiver, and elements of the transceiver are not limited to the RF transmitter and the RF receiver.

In addition, the transceiver may receive a signal through a wireless channel, output the signal to the UE processor 1801, and may transmit a signal output from the UE processor 1801 through a wireless channel.

The memory (not shown) may store programs and data necessary for the operation of the UE. In addition, the memory may store control information or data included in a signal obtained from the UE. The memory may include a storage medium such as a ROM, a RAM, a hard disk, a CD-ROM, a DVD, or a combination of storage media.

The UE processor 1801 may control a series of processes so that the UE may operate according to the above-described embodiment. The UE processor 1801 may be implemented by a controller or one or more processors.

Meanwhile, the embodiments disclosed in the specification and drawings are merely provided as specific examples in order to easily explain the technical content of the disclosure and to aid understanding of the disclosure, and are not intended to limit the scope of the disclosure. That is, it will be obvious to a person skill in the art that various modifications may be made based on the technical scope of the disclosure. In addition, each of the above embodiments may be performed in combination with each other as necessary.

Although the present disclosure has been described with various embodiments, various changes and modifications may be suggested to one skilled in the art. It is intended that the present disclosure encompass such changes and modifications as fall within the scope of the appended claims

What is claimed is:

1. A method by a base station in a communication system, the method comprising:
    determining a number of discrete fourier transform (DFT)-precoding chunks on which a DFT precoding is performed;
    determining a power backoff value of a power amplifier (PA) of the base station;
    transmitting information indicating the number of DFT-precoding chunks to a terminal;
    transmitting, to the terminal, downlink control information (DCI) including a resource allocation field, configured based on the number of DFT-precoding chunks; and
    transmitting data to the terminal according to the resource allocation field included in the DCI,
    wherein the number of DFT-precoding chunks is associated with the power backoff value of the PA of the base station.

2. The method of claim 1, further comprising transmitting the information indicating the number of DFT-precoding chunks to the terminal through at least one of system information, a radio resource control (RRC) signaling, and the DCI.

3. The method of claim 1, further comprising:
    determining a size of the determined number of DFT-precoding chunks, and
    wherein the resource allocation field is configured based on the determined size of the DFT-precoding chunks.

4. The method of claim 3, wherein the DCI includes information related to the determined size of the DFT-precoding chunks.

5. A method by a terminal in a communication system, the method comprising:
    receiving, from a base station, information indicating a number of discrete fourier transform (DFT)-precoding chunks on which DFT precoding is performed;
    receiving, from the base station, downlink control information (DCI) including a resource allocation field configured based on the number of DFT-precoding chunks; and
    receiving data from the base station based on the resource allocation field included in the DCI,
    wherein the number of DFT-precoding chunks is associated with a power backoff value of a power amplifier (PA) of the base station.

6. The method of claim 5, further comprising receiving the information indicating the number of DFT-precoding chunks from the base station through at least one of system information, a radio resource control (RRC) signaling, or the DCI.

7. The method of claim 5, wherein a size of the number of DFT-precoding chunks is further determined by the base station, and
    wherein the resource allocation field is configured based on the size of the DFT-precoding chunks.

8. The method of claim 7, wherein the DCI includes information related to the size of the DFT-precoding chunks.

9. A base station in a communication system, the base station comprising:
    a transceiver; and
    a controller operably connected to the transceiver, the controller configured to:
        determine a number of discrete fourier transform (DFT)-precoding chunks on which DFT precoding is performed,
        determine a power backoff value of a power amplifier (PA) of the base station,
        transmit information indicating the number of DFT-precoding chunks to a terminal,
        transmit, to the terminal, downlink control information (DCI) including a resource allocation field configured based on the number of DFT-precoding chunks, and
        transmit data to the terminal according to the resource allocation field included in the DCI,
    wherein the number of DFT-precoding chunks is associated with the power backoff value of the PA of the base station.

10. The base station of claim 9, wherein the controller is further configured to transmit the information indicating the number of DFT-precoding chunks to the terminal through at least one of system information, radio resource control (RRC) signaling, or the DCI.

11. The base station of claim 9, wherein the controller is configured to:
    determine a size of the determined number of DFT-precoding chunks; and
    wherein the resource allocation field is configured based on the determined size of the DFT-precoding chunks.

12. The base station of claim 11, wherein the DCI includes information related to the determined size of the DFT-precoding chunks.

13. A terminal in a communication system, the terminal comprising:
    a transceiver; and
    a controller operably connected to the transceiver, the controller configured to:
        receive, from a base station, information indicating a number of discrete fourier transform (DFT)-precoding chunks on which a DFT precoding is performed,
        receive, from the base station, downlink control information (DCI) including a resource allocation field configured based on the number of DFT-precoding chunks, and
        receive data from the base station based on the resource allocation field included in the DCI,
    wherein the number of DFT-precoding chunks is associated with a power backoff value of a power amplifier (PA) of the base station.

14. The terminal of claim 13, wherein the transceiver is further configured to receive the information indicating the number of DFT-precoding chunks from the base station through at least one of system information, a radio resource control (RRC) signaling, or downlink control information (DCI).

15. The terminal of claim 13, wherein a size of the number of DFT-precoding chunks is further determined by the base station, and
    wherein the resource allocation field is configured based on the size of the DFT-precoding chunks.

16. The terminal of claim 15, wherein the DCI includes information related to the size of the DFT-precoding chunks.

* * * * *